(12) United States Patent
Thomas et al.

(10) Patent No.: US 8,220,199 B2
(45) Date of Patent: Jul. 17, 2012

(54) ROOT FEEDER

(75) Inventors: Jeffrey K. Thomas, Commerce Township, MI (US); Frank J. Walker, Troy, MI (US)

(73) Assignee: MC-10, L.L.C., Farmington Hills, MI (US)

(*) Notice: Subject to any disclaimer, the term of this patent is extended or adjusted under 35 U.S.C. 154(b) by 192 days.

(21) Appl. No.: 12/467,487

(22) Filed: May 18, 2009

(65) Prior Publication Data
US 2009/0282736 A1  Nov. 19, 2009

Related U.S. Application Data

(60) Provisional application No. 61/053,828, filed on May 16, 2008.

(51) Int. Cl.
*A01G 29/00* (2006.01)
(52) U.S. Cl. ........................................................ 47/48.5
(58) Field of Classification Search ................ 47/77, 73, 47/66, 32.7, 32, 31.1, 48.5
See application file for complete search history.

(56) References Cited

U.S. PATENT DOCUMENTS

| | | | |
|---|---|---|---|
| 666,072 A * | 1/1901 | Sherman | 47/48.5 |
| 1,530,109 A * | 3/1925 | Cummings | 405/48 |
| 1,586,676 A * | 6/1926 | Heath | 47/74 |
| 1,791,873 A | 2/1931 | Neiman | |
| 1,959,139 A | 5/1934 | Otwell | |
| 1,993,620 A | 3/1935 | Otwell | |
| 2,145,934 A * | 2/1939 | Kingman | 47/47 |
| 4,175,356 A | 11/1979 | Allen | |
| 5,642,854 A * | 7/1997 | Hatton | 229/149 |
| 5,795,100 A | 8/1998 | Thomas et al. | |
| 5,911,540 A | 6/1999 | Adamson | |
| 5,975,797 A | 11/1999 | Thomas et al. | |
| 5,996,279 A * | 12/1999 | Zayeratabat | 47/48.5 |
| 6,164,338 A | 12/2000 | Holzer et al. | |
| 6,408,570 B1 | 6/2002 | Shih et al. | |
| 6,540,436 B2 | 4/2003 | Ogi | |
| 6,984,090 B2 | 1/2006 | Allen | |
| 2008/0025796 A1 | 1/2008 | Allen | |

* cited by examiner

*Primary Examiner* — Monica Williams
(74) *Attorney, Agent, or Firm* — Gifford, Krass, Sprinkle, Anderson & Citkowski, P.C.

(57) ABSTRACT

A root feeder for watering feeding and enhancing the air flow to the roots of a plant when the root feeder is at least partially buried in soil adjacent to the root system, the feeder including body panels folded from flat stock and locked together to form a body having an interior volume and a plurality of apertures providing for circulation of air and/or water and nutrients through the body to the roots of the plant.

6 Claims, 3 Drawing Sheets

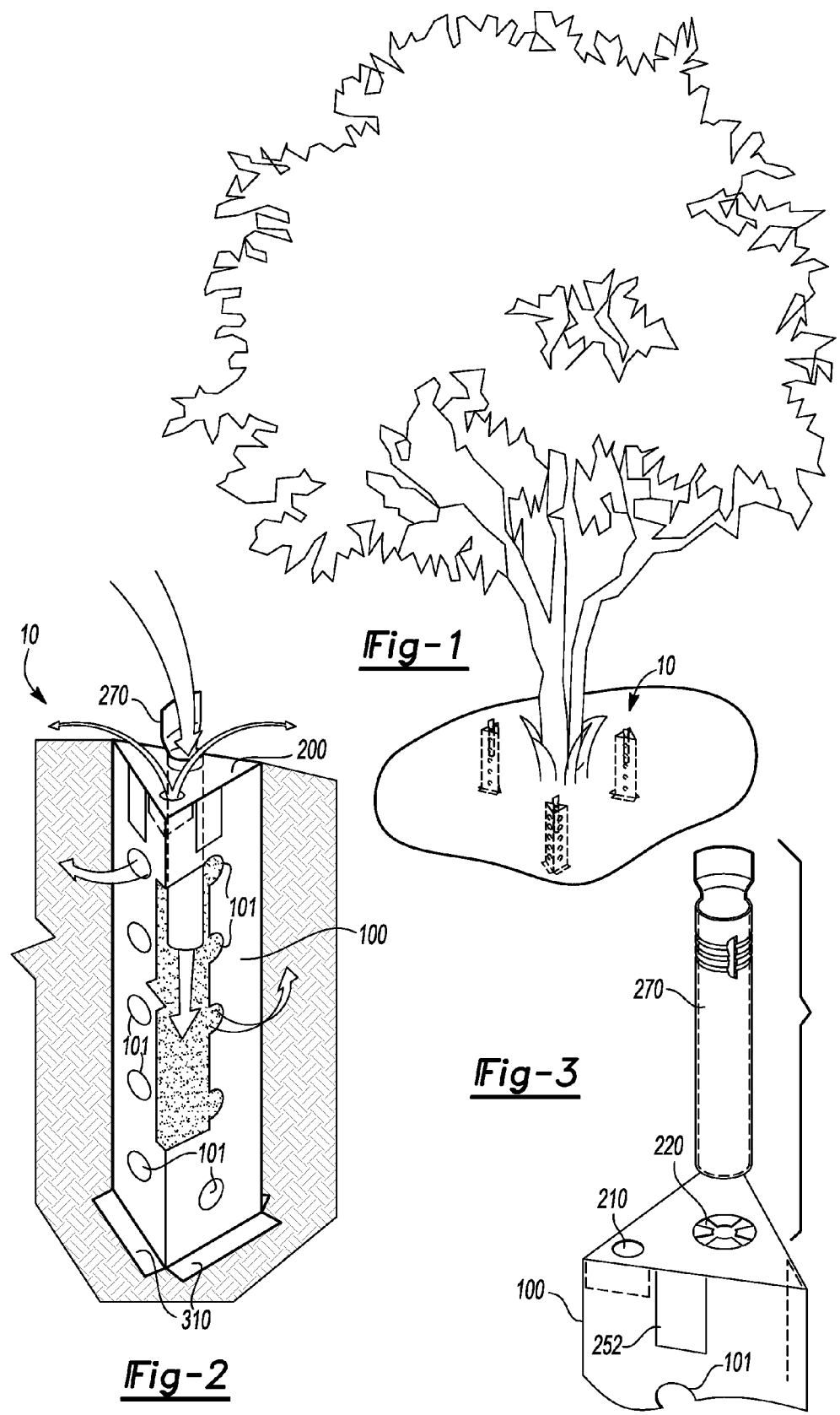

ROOT FEEDER

CROSS-REFERENCE TO RELATED APPLICATIONS

This Application claims the benefit of U.S. Provisional Application 61/053,828 filed on May 16, 2008.

FIELD OF THE INVENTION

This invention relates to a feeding device for plants such as trees and the like that provides irrigation, oxygenation and nutrients to the roots of the plant and more particularly to such a device that can be economically produced and shipped and which can be readily assembled at the point of use.

BACKGROUND OF THE INVENTION

The planting of trees, bushes, shrubs and the like provides for a multitude of beneficial values to residential homeowners, corporate business environments, etc. The planting of such trees, bushes, etc. typically involves the digging of an appropriate hole in the ground, placing the item to be planted at least partially within the hole and placing loose soil around the roots of the plant. It is critical during an initial plant growth stage that the plant's root system receives necessary water, air, nutrients and the like.

We have previously provided such a feeder. A description of a feeder which meets these requirements can be found in our U.S. Pat. No. 5,975,797. The present feeder is an improvement of our previous feeder.

SUMMARY OF THE INVENTION

The present invention includes a feeder for the root system of a plant. As such, the root feeder has utility as a nutrient system for trees, shrubs, bushes and the like.

The root feeder disclosed herein includes a body having a top surface, the body having a plurality of apertures that afford for air, water, nutrients and the like to pass there through. The top surface is attached to the body and includes at least two apertures. A first aperture is larger than a second aperture, and thereby enhances the circulation of air into and out of the body through the top surface apertures. The enhanced air circulation into and out of the body results in fresh air enriched with oxygen entering into the body and stale air deprived of oxygen exiting the body. The apertures within the body result in the exchange of oxygen with the root system and the plant. It is appreciated that for the purposes of the present invention, that the term "stale air" and/or "air deprived of oxygen" means air that has a reduced level of oxygen when compared to air having normal or typical oxygen levels. For example, stale air or air deprived of oxygen includes air within the body of the root feeder disclosed herein that has provided oxygen to the root system of a plant and may or may not be enriched with carbon dioxide produced by the plant.

In some instances, the body can be made from a plurality of panels, with at least one of the panels having the plurality of apertures therein. The plurality of panels can be defined by three panels, with a first panel having an interlocking tab extending therefrom, a second panel extending from the first panel to a third panel and the third panel having an interlocking tab slot that is dimensioned to accept the interlocking tab of the first panel. Fold lines typically define the boundaries between the first, second and third panels and afford for the folding of these panels relative to each other and the insertion of the interlocking tab into the interlock tab slot. Once the three panels have been folded along the appropriate fold lines and the interlocking tab inserted within the interlocking tab slot, the top surface which is attached to the third panel can be folded along a fold line and have a top surface enclosure tab inserted within an enclosure tab slot such that the top surface is attached to body and covers an interior volume defined by the three panels.

The top surface has at least two apertures, with a first aperture being larger than a second aperture. The first aperture can include a tube retaining flap that extends from the outer edge of the aperture in a generally inward direction. Optionally included can be a convection tube that is dimensioned to fit at least partially within the first aperture of the top surface. The convection tube can include a radial ridge extending from an outer surface of the tube, the radial ridge operable to catch upon the tube retaining flap. In addition, the convection tube can have a flared end, the flared end dimensioned such that it cannot pass through the first aperture of the top surface. The convection tube enhances the flow of air into the body of the root feeder.

The body of the root feeder can also include stabilizer flaps that are located at a bottom end of the body. The stabilizer flaps afford for the root feeder to remain in position once surrounded with soil such that watering and movement of the soil does not result in the root feeder rising in a generally upward direction from its original position.

The body is formed from a flat piece of cardboard or the like which can be shipped flat and folded at the point of use to form a plurality of body panels, the body panels enclosing the interior volume. The root feeder can be manufactured from any generally flat piece of material that has been die cut to include the apertures, the top surface, and fold lines for the body panels. The feeder can be shipped relatively economically in a flat condition and then assembled at the point of use. In some instances, a convection tube can be included, the convection tube at least partially inserted into the first aperture in the top surface.

BRIEF DESCRIPTION OF THE DRAWINGS

FIG. 1 is a perspective view of an embodiment of the present invention after installment adjacent to a plant;

FIG. 2 is a perspective view illustrating air flow into and out of an embodiment of the present invention;

FIG. 3 is a perspective view of a top surface for an embodiment of the present invention;

DETAILED DESCRIPTION OF THE PREFERRED EMBODIMENTS

Figure 4:
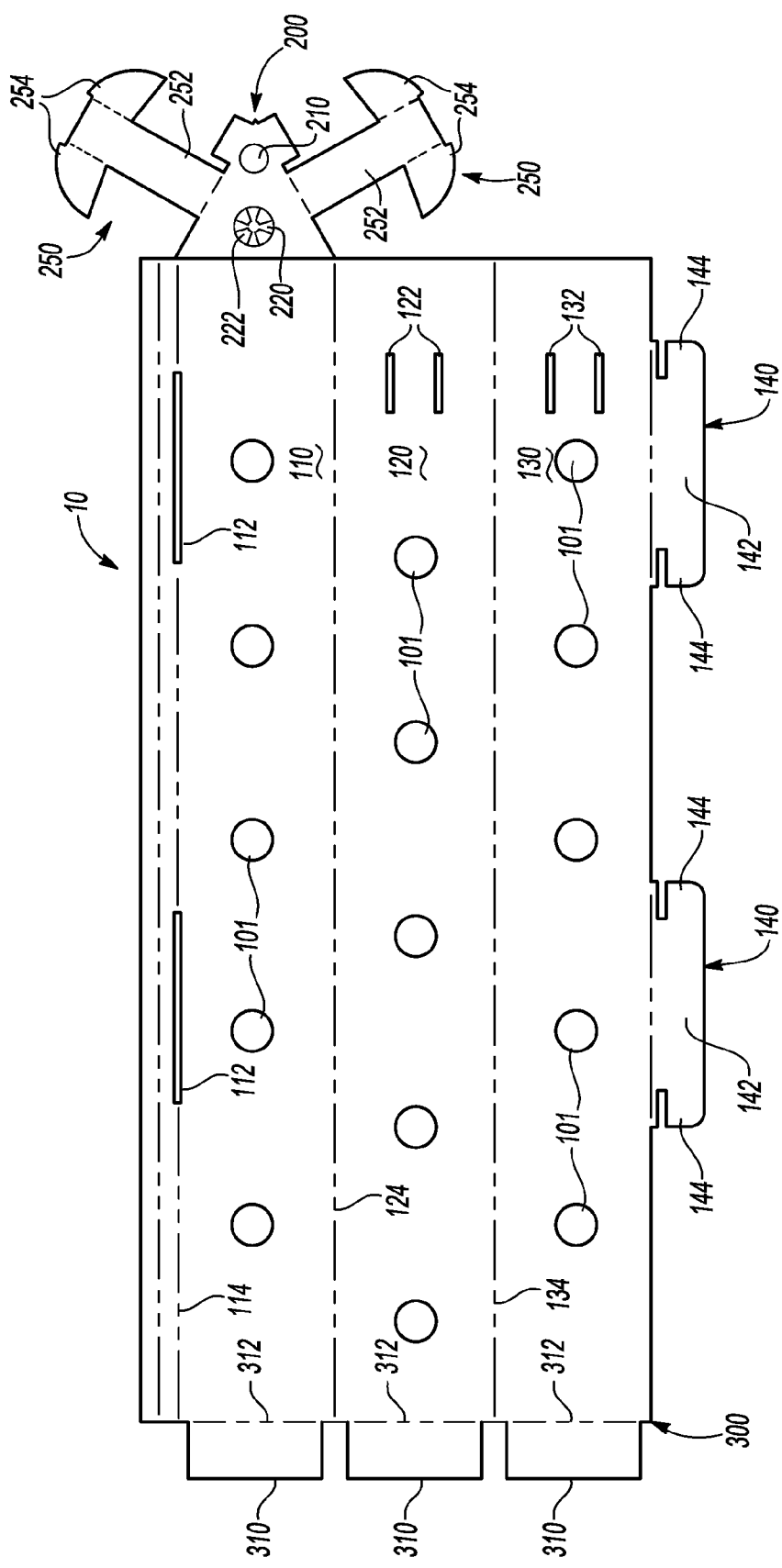
FIG. 4 is a top view of an embodiment of the present invention before assembly.

Referring now to FIG. 1, a perspective view of an embodiment of the root feeder is shown generally at reference numeral 10. As illustrated in FIG. 1, the root feeder 10 can be positioned adjacent to a root system of a plant. In some instances, the root feeder is positioned such that a top end of the feeder is proximate to the ground level where the plant has been planted and has exposure to the air.

FIGS. 2 and 3 illustrate a perspective view of the root feeder 10 wherein a body 100 has a plurality of apertures 101. Also included is a top surface 200, the top surface 200 having at least two apertures with a first aperture 210 and a second aperture 220. Optionally included is a convection tube 270 that is dimensioned to fit or slide within the second aperture 220.

Turning now to FIG. 4, a top view of the root feeder 10 before assembly is shown. The root feeder 10 shown in FIG. 4 can be die cut from a variety of materials, illustratively including paper, cardboard, plastic, plastic or wax coated paper, foam, extruded materials and the like. In some instances, a biodegradable material can be used to produce the root feeder 10. The root feeder 10 can include a first panel 110, a second panel 120 and a third panel 130. It is appreciated that the root feeder 10 can be made from a single panel in a cylindrical shaped tube or from more than three body panels.

The first body panel 110 can have panel apertures 101 and an interlock tab slot 112. In addition, the first panel 110 can have a fold line 114. Adjacent to the first panel 110 and extending therefrom is the second panel 120. The second panel 120 can optionally include the apertures 101 and top enclosure tab slots 122. Extending from the second panel 120 is the third panel 130, the third panel 130 optionally including the apertures 101 and the top enclosure tab slots 132. Between the first panel 110 and the second panel 120 is a fold line 124, and likewise between the second panel 120 and the third panel 130 is a fold line 134. In some instances, a stabilizer flap 310 can extend from a bottom end 300 of the root feeder 10 from the first panel 110, the second panel 120 and/or the third panel 130. A fold line 312 can be located at the bottom end 300 between the stabilizer flap 310 and the respective body panel. In addition to the apertures 101, the top enclosure tab slots 132 and/or the stabilizer flap 310, the third panel 130 can have an interlock tab 140 extending therefrom. The interlock tab 140 can have a body 142 with a tab 144 extending therefrom. In some instances, the body 142 has a pair of tabs 144 that extend from the body in a generally outwardly direction from said body 142.

Extending from the first panel 110, in addition to the optional stabilizer flap 310, is the top surface 200. The top surface 200 can have a shape such that upon assembly of the first panel 110, the second panel 120 and the third panel 130 to form the body of the root feeder 10, the top surface 200 encloses an interior volume defined therein. The top surface 200 can include at least two apertures, with a first aperture 210 and a second aperture 220. The second aperture 220 is larger than the first aperture 210 and can include a convection tube retaining flap 222 that extends from an outer edge of second aperture 220 in a generally inward direction. Extending from the top surface 200 can be a top surface enclosure tab 250. The enclosure tab 250 can have a strap 252 with an insert tab 254 extending therefrom. In some instances, the strap 252 has a pair of oppositely disposed insert tabs 254. It is appreciated that the insert tabs 254 are dimensioned such that they can be inserted at least partially within the top enclosure tab slots 122 and 132 of the second panel 120 and/or third panel 130, respectively.

Figure 5:
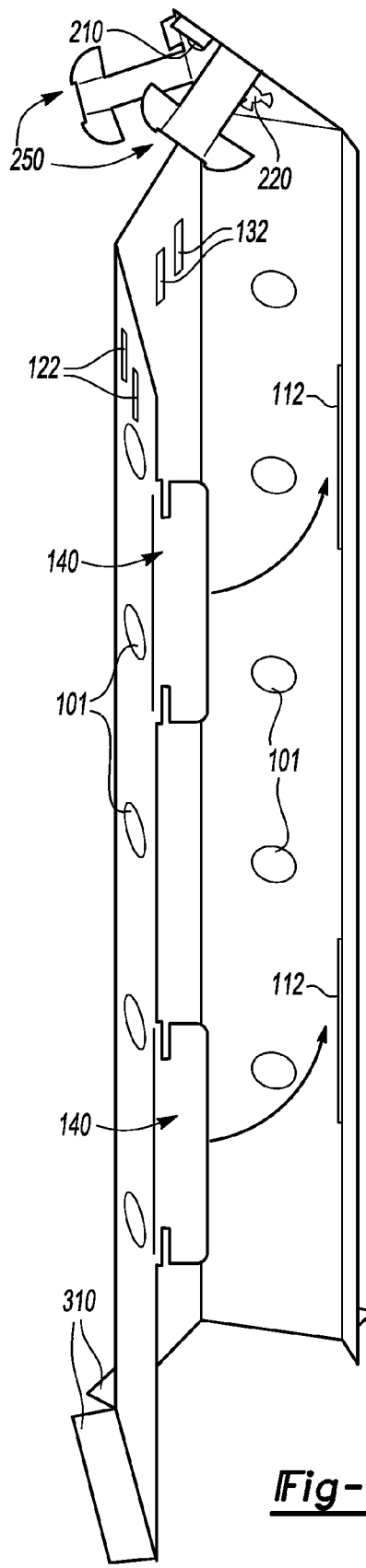
FIG. 5 is a perspective view illustrating assembly of an embodiment of the present invention.

Looking now at FIG. 5, an illustrative assembly of the root feeder 10 is shown, wherein the die cut layer shown in FIG. 4 has been folded along the appropriate fold lines and the tabs are to be inserted within the appropriate slots to form the body 100. In particular, the interlock tab 140 is to be inserted within the interlock tab slot 112 such that an interior volume is defined within the first panel 110, the second panel 120 and the third panel 130. In addition, the top surface enclosure tab 250 is to be inserted within the slots 122 and/or 132 such that the top surface covers the interior volume defined within the assembled panels 110, 120 and 130. In this manner, the feeder 10 is assembled and has a generally rigid body 100. Also illustrated in FIG. 5 are the stabilizer flaps 310 extending from the bottom end 300 of the root feeder 10, the flaps 310 having been folded along fold line 312 and extend in a generally outwardly direction from the interior volume of the body 100.

Figure 6:
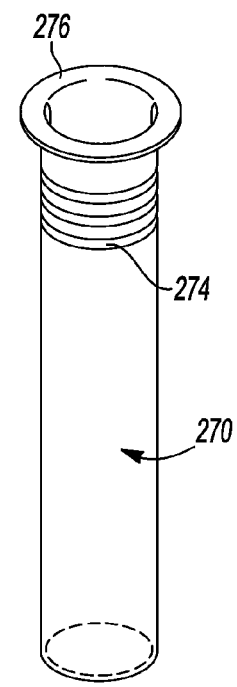
FIG. 6 is a perspective view of a convection tube according to an embodiment of the present invention.

Looking now to FIG. 6, the air convection tube 270 is shown with an optional radial ridge 274 extending from an outer surface of the tube 270 and an optional flared end 276. It is appreciated that the air convection tube 270 can be inserted at least partially within the second aperture 220 of the top surface 200 with the radial ridge 274 and/or the flared end 276 preventing the tube 270 from passing all the way through. It is also appreciated that the flared end 276 of the convection tube 270 can have a variety of shapes, for example the partially flared end shown in FIGS. 2 and 3, so long as the flared end 276 retards the convection tube 270 from passing completely through the second aperture 220.

Figure 7:
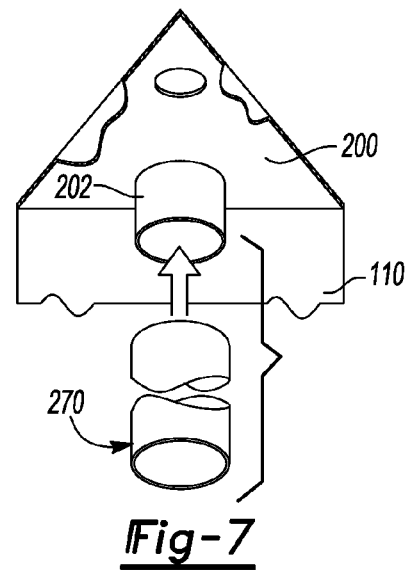
FIG. 7 is a perspective view of a convection tube according to another embodiment of the present invention.

In the alternative, the convection tube 270 can be attached to the top surface 200 using a nipple 202 as illustrated in FIG. 7, the convection tube 270 and the nipple 202 having complimentary shapes that afford for the sliding of the tube 270 at least partially within or around the nipple 202. The convection tube 270 can be attached to the nipple 202 using an interference fit, adhesives, glue, welding, threads, and the like. In addition, the convection tube 270 can be made integral with the nipple 202 and/or the top surface 200.

In operation, the root feeder can be shipped to a customer in a flat state, as it has been die cut from material stock. When a user is ready to install the root feeder, it can be assembled quickly without the use of secondary fasteners, adhesives and the like. Using the fold lines provided, the root feeder is folded to the desired shape that has been predetermined by the die cut design. Although the figures discussed above illustrate a triangular shaped body, any other multi-sided shape that has more than two sides can be used. The three sided triangular shaped root feeder or any other shaped root feeder provides a continuous vertical pathway from the ground surface to the root area below the surface such that air, water and nutrients flow easily and effectively to the root system. This vertical pathway promotes plant development and a healthy new root system development that assists in the growing and healing process from the shock of the plant being recently planted.

When the root feeder is fully assembled, it can be placed on the outside wall of a hole that has been dug for the plant and located flush with the surrounding ground surface. The soil can then be loosely packed around the root feeder and additional dirt can be added later when the surrounding soil has settled.

For example and for illustrative purposes only, the root feeder 10 shown in FIG. 4 can be taken and folded about the fold lines 114, 124 and 134 in order to form a triangular shaped body as illustrated in the perspective view drawings. Once the triangular shaped body has been formed, the interlock tabs 140 are inserted within the interlock tab slots 112 in order to form a generally rigid body structure. Thereafter, the top surface 200 extending from the first panel 110 is folded about a fold line 202 and the top surface enclosure tabs 250 are inserted at least partially within the top enclosure tab slots 122 and/or 132 of the second panel 120 and/or third panel 130, respectively. Thereafter, the stabilizer flaps 310 can be bent about the fold line 312 in order to form an outwardly extending structure from the bottom end 300. The root feeder 10 is then placed adjacent to the outside wall of a hole that has been provided for the planting of a tree, shrub, etc. Once the root feeder 10 has been placed adjacent to the outside wall of a hole dug for a plant, with the top surface 210 being proximate to the ground surface, soil can be loosely packed around the root feeder 10 either before or after the plant has been positioned at least partially within the hole. Either before or after the root feeder 10 has been placed adjacent to the outside wall of the hole, the optional air convection tube 270 can be inserted within the second aperture 220 of the top surface 200.

As can best be seen in FIG. 2, the plant has been planted with the root feeder adjacent thereto, water can be poured into the root feeder through the convention tube 270, said water coming into contact with the root system of the plant through the apertures 101 and the open bottom of the root feeder 10. Nutrients can of course be provided in the water delivered to the root system of the plant. In addition, the different sized apertures within the top surface 200 afford for enhanced circulation of air into and out of the interior volume within the body 100. In particular, fresh air flows down into the root feeder 10 while stale air, that may or may not be warmer than the fresh air entering into the feeder, exits through the first aperture 210. In this manner, an enhanced root feeder is provided that affords for improved water, air and nutrient application to the root system of a plant.

It should be apparent that a root feeder has been provided that utilizes relatively inexpensive materials and which because it is flat when shipped is relatively inexpensive to ship to the point of use. The result is a feeder which is greatly reduced in cost to the end user.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A root feeder for providing nutrients and water to a plant and for enhancing air flow to the roots of the plant when at least partially buried in soil, said root feeder comprising:
a body formed from flat stock folded to form three body panels with a first panel attached to a second panel and a third panel attached to and between said first and second panels, said three body panels defining an interior volume and having a plurality of body apertures; and a top surface extending from said first panel and having an insert tab inserted within a second panel of said body panels, said top surface having at least two apertures with a first aperture being larger than a second aperture, said panels each having a bottom edge with said bottom edges spaced from one anther to define an open bottom;
a convection tube positioned within said first aperture of said top surface and having a first open end above said top surface and a second, lower end opening to the interior of said body whereby nutrients and water can be delivered to the roots of the plant through said convention tube and said convention tube, said second aperture and said body apertures act to permit air to escape from the roots when the convection tube is not being used to deliver water and nutrients to the roots of the plant.

2. The root feeder of claim 1, further comprising a stabilizer flap extending from a bottom end of each of said body panels, said stabilizer flaps operable to stabilize said body when said body is at least partially buried in soil.

3. The root feeder of claim 1 and said top surface comprising a flap attached to said body to retain said tube extending through said first aperture.

4. The root feeder of claim 1 wherein said first end is operable to pass through said first aperture and said second end being too large to pass through said first aperture.

5. The root feeder of claim 4, wherein said second end has a radial ridge extending from an outer surface of said convection tube.

6. The root feeder of claim 1, wherein said top surface has a locking tab extending therefrom and a tab insert slot operable to accept said locking tab.

\* \* \* \* \*